Jan. 5, 1932.    A. G. PERKINS    1,839,255
SEAMING TOOL FOR PIPE JOINTS
Filed March 13, 1930    2 Sheets-Sheet 1
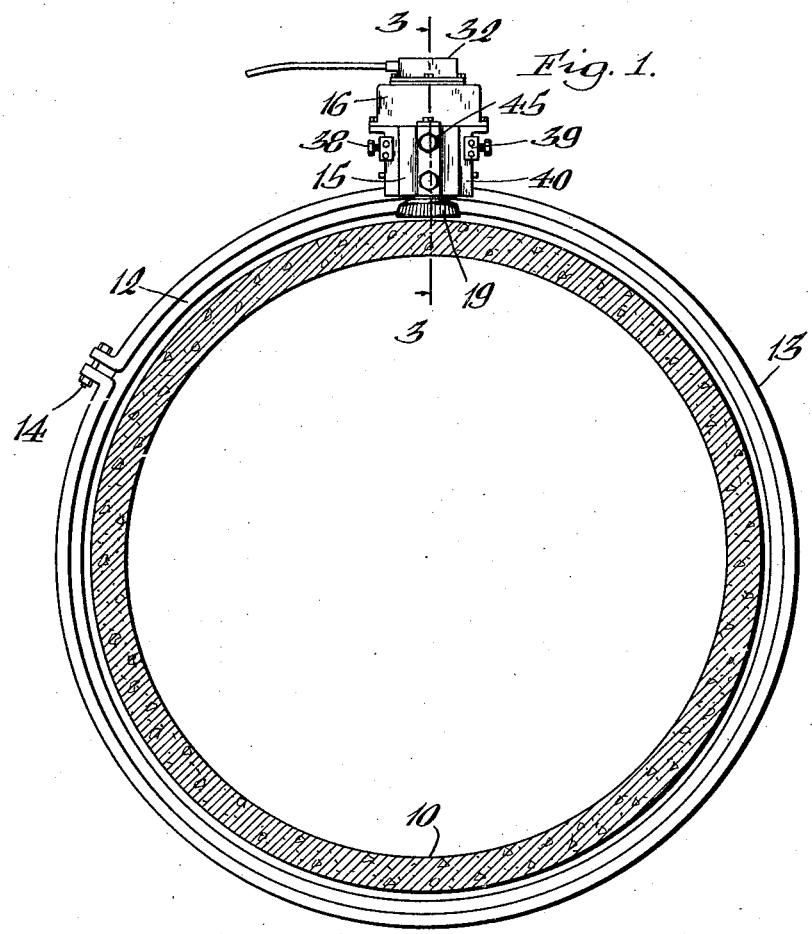
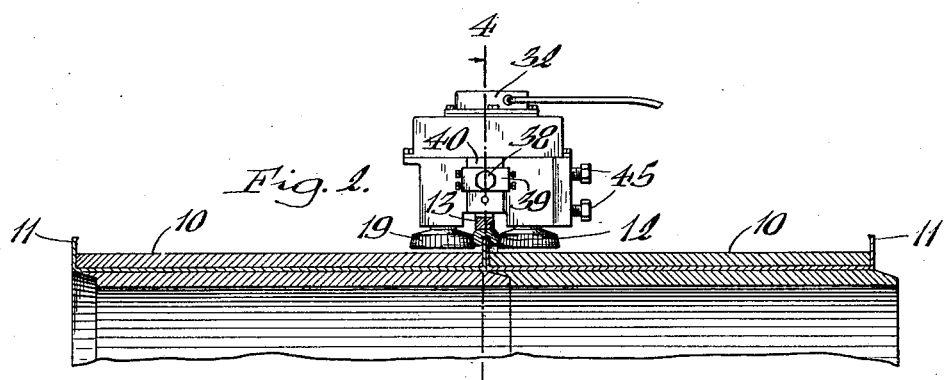
Inventor,
Albert G. Perkins,
by Walter P. Geyer
Attorney.

Jan. 5, 1932.  A. G. PERKINS  1,839,255
SEAMING TOOL FOR PIPE JOINTS
Filed March 13, 1930  2 Sheets-Sheet 2
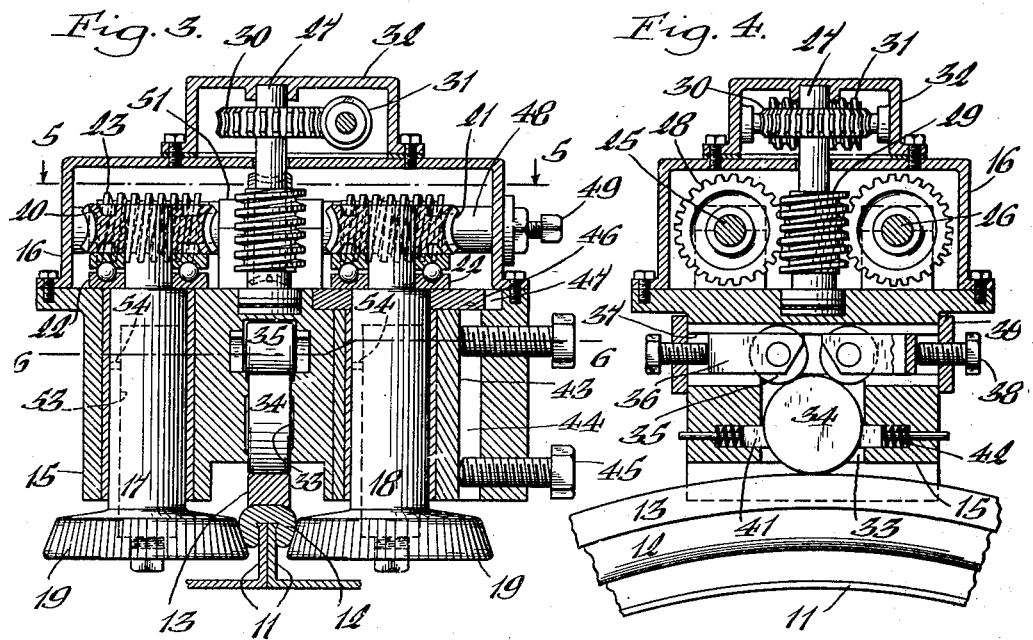
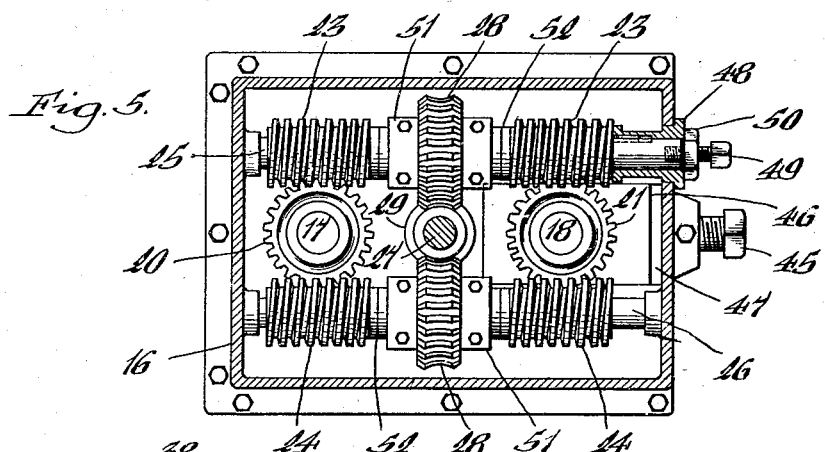
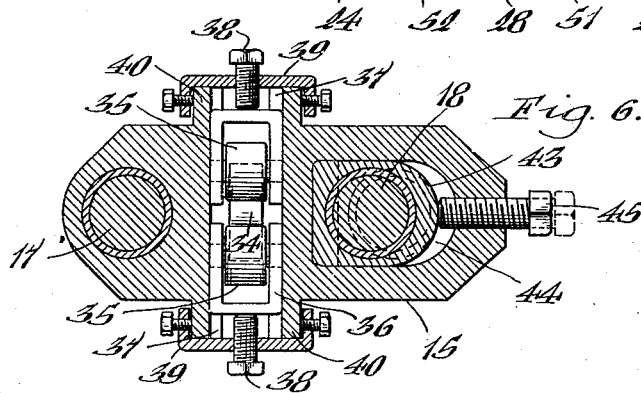
Inventor,
Albert G. Perkins,
by Walter P. Guyer
Attorney.

Patented Jan. 5, 1932

1,839,255

UNITED STATES PATENT OFFICE

ALBERT G. PERKINS, OF BUFFALO, NEW YORK

SEAMING TOOL FOR PIPE JOINTS

Application filed March 13, 1930. Serial No. 435,429.

This invention relates to new and useful improvements in a seaming tool designed particularly for sealing the flanged joints of water pipe lines, concrete pipes and the like.

One of its objects is to improve the drive mechanism of the joint-sealing elements with a view of effecting a positive and balanced drive to such elements.

Another object of the invention is the provision of a tool of this character which is reliable and efficient in operation, which is simple, and compact in construction, and which can be readily applied to and removed from the joint.

In the accompanying drawings:—

Figure 1 is a cross section of a concrete pipe showing my improved tool thereon. Figure 2 is a fragmentary longitudinal section of two pipes showing a front view of the tool in place on the joint. Figure 3 is an enlarged transverse section of the tool taken on line 3—3, Figure 1. Figure 4 is an enlarged longitudinal section of the tool taken on line 4—4, Figure 2. Figure 5 is a horizontal section thereof taken on line 5—5, Figure 3. Figure 6 is a horizontal section of the tool taken on line 6—6, Figure 3.

Similar characters of reference indicate corresponding parts throughout the several views.

By way of example, my improved tool has been shown in connection with a flanged joint connecting a pair of concrete pipe-sections 10, 10 the opposing ends of the sections terminating in outwardly-facing coupling flanges 11, 11 disposed in the plane of the joint edges of the pipe-sections and having a split coupling ring 12 applied to the marginal portions of the flanges for sealing the same to form a fluid-tight joint. The coupling flanges and their sealing ring may be made of steel or other malleable material, so that when the ring is pinched by external pressure applied to opposite sides thereof, a practically integrally united structure and fluid-tight joint is produced. This improved machine is designed to travel about the joint and furnish the desired pressure to so seal the coupling ring to the coupling flanges of the pipes.

Encircling the coupling ring 12 and embracing the top and adjoining sides thereof is a track 13 which may be secured at its ends by a clamping bolt 14 and in addition to firmly securing the clamping ring in place while being sealed, also serves to guide the tool around the joint during the sealing thereof.

The seaming tool consists of a suitable casing in which its parts are mounted, the preferred casing shown in the drawings, consisting of a base-section 15 and a top section 16, these sections being bolted or otherwise fastened together. Journaled in appropriate bearings in the casing-section 15 are parallel, upright shafts 17, 18 which are provided at their lower ends with forming or pressure rollers 19 arranged to engage opposite sides of the coupling ring 12 for propelling the tool in a circular path about the joint and also for compressing the sides of said ring into sealing engagement with the joint-flanges 11. The roller-shafts are disposed substantially in the transverse center line of the casing and at opposite sides of its longitudinal center line, and motion is transmitted thereto by a drive mechanism preferably constructed as follows:—

Applied to the upper ends of the shafts 17, 18 and contained within the casing-section 16 are worm gears 20, 21, respectively, and interposed between these gears and the top side of the casing-section 15 are thrust bearings 22. Each of these worm gears is geared at its opposite sides to companion sets of worms 23 and 24 secured to transverse, horizontal shafts 25 and 26, respectively, journaled in the side walls of the casing, as seen in Figure 5. Said shafts 25, 26 are driven from an upright drive shaft 27 journaled in the upper casing-section substantially centrally between such shafts, the latter having worm gears 28 thereon meshing with the opposite sides of a worm 29 fixed on the drive shaft. As shown in Figure 3, the shaft 27 extends above the top of the casing and may have a worm gear 30 thereon which meshes with a worm 31 driven by any suitable source of power, including a flexible connection to the casing. The gear 30 and worm 31 may be contained within a housing 32 bolted or otherwise secured to the casing-section 16.

By this construction and arrangement of parts, a positive, uniform and balanced drive is transmitted to each of the roller-shafts 17 and 18, resulting in an equalization of pressure applied by the rollers 19 to opposite sides of the coupling ring 12 and affording an equal distribution of the resulting strains to the various elements of the drive mechanism.

Contained within the upright portion of a T-slot or opening 33 formed in the casing-section between the roller-shafts 17, 18 is a guiding or sustaining roller 34 for the tool, the same being adapted to travel on the peripheral surface of the track 13. Thrust rollers 35 are preferably adjustable toward and from the center of the upper peripheral side of the track-roller, and for this purpose each is mounted in a forked bearing 36 guided in grooves 37 formed in the side walls of the upper or transverse portion of the T-shaped opening 33, these rollers being urged toward the track-roller by adjusting screws 38 mounted in corresponding yoke-plates 39 detachably applied to extensions 40 formed at the front and rear sides of the casing-section 15, as seen in Figures 4 and 6. Engaging the lower portion of the roller 34 at opposite sides of its center are follower-blocks 41 which act to prevent the roller shifting downwardly out of the casing, coil springs 42 being provided to offer the required resistance to prevent such displacement of the roller.

In order to permit the ready application and removal of the tool to and from the joint being operated upon, one of the forming roller-shafts is shiftable toward and from the other transversely of the casing. To this end, the roller-shaft 18 is journaled in a bearing-block 43 adjustably guided for movement in an opening 44 formed in the base-section 15 of the casing, such block being normally held in its operative position by clamping bolts 45. Upon loosening these bolts, the shaft 18 together with its roller 19 may be shifted outwardly to bring the latter clear of the coupling ring 12 of the joint, and thereby enable the machine to be applied to or removed from the joint in an obvious manner. Applied to the upper portion of the shaft 18 and shiftable therewith is a cover plate 46 which is guided in a groove 47 formed in the top side of the casing-section 15 and which constitutes a closure for the opening 44 to prevent loss of lubricant contained in the upper gear casing 16.

To enable the roller-shaft 18 with its gear 21 to be shifted toward and from the companion shaft 17 relative to the worms 23, 24, one of the worms, say the worm 23, is so mounted as to be shiftable lengthwise on its shaft 25 as a unit with said shaft 17. This action is preferably attained by splining the worm 23 on its shaft, as seen in Figure 5, so that it can slide thereon, and applying to the end of the shaft a sleeve 48 which extends through the adjoining wall of the casing-section 16. Fitted in the end of the shaft 25 is a screw 49 having an adjusting nut 50 thereon which normally abuts against the outer end of the sleeve to hold the latter against the worm 23. Upon loosening the nut, the sleeve 48 is free to move outwardly, allowing the worm to slide on its shaft as the roller-shaft 18 is shifted to spread the rollers and permit the application and removal of the tool to and from the joint. As the worm 23 is slid lengthwise on its shaft in response to the movement of the roller-shaft 18, the gear 21 thereof rolls over the companion worm 24.

As clearly shown in Figure 3, the forming or seaming rollers 19 are substantially frusto-conical in shape, their corrugated bearing faces converging upwardly to grip the inner portion of the coupling ring 12 of the joint and thus prevent outward displacement of the tool when revolving about the joint to seal it.

Intermediate its ends and on opposite sides of the respective worm gears 28, each shaft 25, 26 is preferably journaled in bearings 51 and interposed between these bearings and the worms 23, 24 are thrust bearings 52.

Lubrication of the roller shafts 17 and 18 may be effected by providing each of them with a lubricant chamber 53 having one or more ports 54 therein for delivering the lubricant to the bearings.

I claim as my invention:—

1. A tool for sealing pipe joints, comprising a casing movable along and in the plane of the joint, upright shafts journaled in said casing and provided at their lower ends with seaming rollers adapted for engagement with opposite sides of the joint to seal it, a drive shaft disposed parallel with and between the upper ends of said roller-shafts, and a driven shaft disposed at right angles to the latter and geared to the drive shaft and said roller-shafts.

2. A tool for sealing pipe joints, comprising a casing movable along and in the plane of the joint, upright shafts journaled in said casing and provided at the lower ends with seaming rollers adapted for engagement with opposite sides of the joint to seal it and at their upper ends with driving elements, an upright drive shaft disposed substantially centrally between said roller-shafts, and horizontally-disposed driven shafts arranged on opposite sides of the drive shaft and roller shafts and in driving engagement therewith.

3. A tool for sealing pipe joints, comprising a casing movable along and in the plane of the joint, upright shafts journaled in said casing in transversely-spaced relation and provided at their lower ends with seaming rollers adapted for engagement with opposite sides of the joint to seal it and at their upper ends with worm gears, an upright drive shaft disposed substantially centrally between said roller-shafts and having a worm thereon, and horizontal driven shafts arranged transversely of the casing at opposite sides of the drive shaft and roller-shafts, each of said driven shafts having a worm gear thereon meshing with the worm on the drive shaft and worms meshing with the worm gears on the roller-shafts.

4. A tool for sealing pipe joints, comprising a casing movable along and in the plane of the joint, upright shafts journaled side by side in said casing and provided at their lower ends with seaming rollers adapted for engagement with opposite sides of the joint to seal it and at their upper ends with drive gears, one of said shafts being shiftable transversely of the casing toward and from the other, means for controlling the relative movements of said shiftable shaft for effecting the application and removal of the tool to and from the joint, and a horizontal driven shaft journaled transversely of the casing and having gears thereon meshing with the companion roller-shaft gears, one of the driven shaft gears being slidably mounted on its shaft for movement with the transversely-shiftable roller-shaft.

5. A tool for sealing pipe joints, comprising a casing movable along and in the plane of the joint, upright shafts journaled side by side in said casing and provided at their lower ends with seaming rollers adapted for engagement with opposite sides of the joint to seal it and at their upper ends with drive gears, one of said shafts being shiftable transversely of the casing toward and from the other, means for controlling the relative movements of said shiftable shaft for effecting the application and removal of the tool to and from the joint, a horizontal driven shaft journaled transversely of the casing and having gears thereon meshing with the companion roller-shaft gears, one of the driven shaft gears being slidably mounted on its shaft for movement with the transversely-shiftable roller-shaft, and means for normally maintaining said slidable gear in operative engagement with the corresponding roller-shaft gear.

6. A tool for sealing pipe joints, comprising a casing movable along and in the plane of the joint, upright shafts journaled side by side in said casing and provided at their lower ends with seaming rollers adapted for engagement with opposite sides of the joint to seal it and at their upper ends with drive gears, one of said shafts being shiftable transversely of the casing toward and from the other, means for controlling the relative movements of said shiftable shaft for effecting the application and removal of the tool to and from the joint, a horizontal driven shaft journaled transversely of the casing and having gears thereon meshing with the companion roller-shaft gears, one of the driven shaft gears being slidably mounted on its shaft for movement with the transversely-shiftable roller-shaft, means for normally maintaining said slidable gear in operative engagement with the corresponding roller-shaft gear, including a sleeve applied to the driven shaft and bearing at one end against the slidable gear, and a threaded element secured to end of said driven shaft and having an adjusting nut thereon engageable with the opposite end of said sleeve.

7. A tool for sealing pipe joints, comprising a casing movable along and in the plane of the joint, upright shafts journaled in said casing and provided at their lower ends with seaming rollers adapted for engagement with opposite sides of the joint to seal it and at their upper ends with drive gears, one of said shafts being shiftable toward and from the other transversely of the casing, means for controlling the relative movement of said shiftable shaft for effecting the application and removal of the tool to and from the joint, horizontal driven shafts arranged transversely of the casing on opposite sides of said roller-shafts, and gears mounted on said driven shafts and meshing with the opposite sides of the corresponding gears on the roller-shafts, one of the driven shaft gears meshing with the shiftable roller-shaft gear being slidably mounted on its shaft for movement with such roller-shaft and the other of said driven shaft gears being immovable on its shaft and over which the companion roller shaft gear is free to roll during the shifting movements of its shaft.

ALBERT G. PERKINS.